2,811,094

VENTILATOR GRILL

George G. Auer, Lakewood, Ohio

Application July 29, 1953, Serial No. 370,989

1 Claim. (Cl. 98—40)

This invention relates to improvements in a ventilator grill.

One of the objects of the present invention is to provide a ventilator grill of generally rectangular shape so as to be concentric with the room walls to provide uniformity of flow.

A further object of the present invention is to provide a ventilator grill to be made from a single plate of flat metal.

A further object of the present invention is to provide a ventilator grill for controlling air distribution in conditioning rooms or other inclosures by either raising the temperature of the room during the colder season of the year or by lowering it by air conditioning it during the warmer season.

A further object of the present invention is to provide a grill suitable for either an outlet or an inlet.

A further object of the present invention is to provide a ventilator grill constructed to permit air to pass through it uniformly and to be directed outwardly in diverging streams in the form of a frustrum of a pyramid with the pyramid rapidly enlarging outwardly away from the grill so that the air thoroughly intermixes itself with the other air in the room to produce a substantially uniform temperature therein.

A further object of the present invention is to provide a grill characterized by its structural simplicity, economy of manufacture, and its operating efficiency providing substantial uniformity of air flow therethrough so that uniformly diffused air flow results outside thereof.

Other features of this invention reside in the arrangement and design of the parts for carrying out their appropriate functions.

Other objects and advantages of this invention will be apparent from the accompanying drawings and description and the essential features will be set forth in the appended claim.

In the drawings,

Fig. 1 is a plan or outside view of the ventilator grill; while

Figure 1:
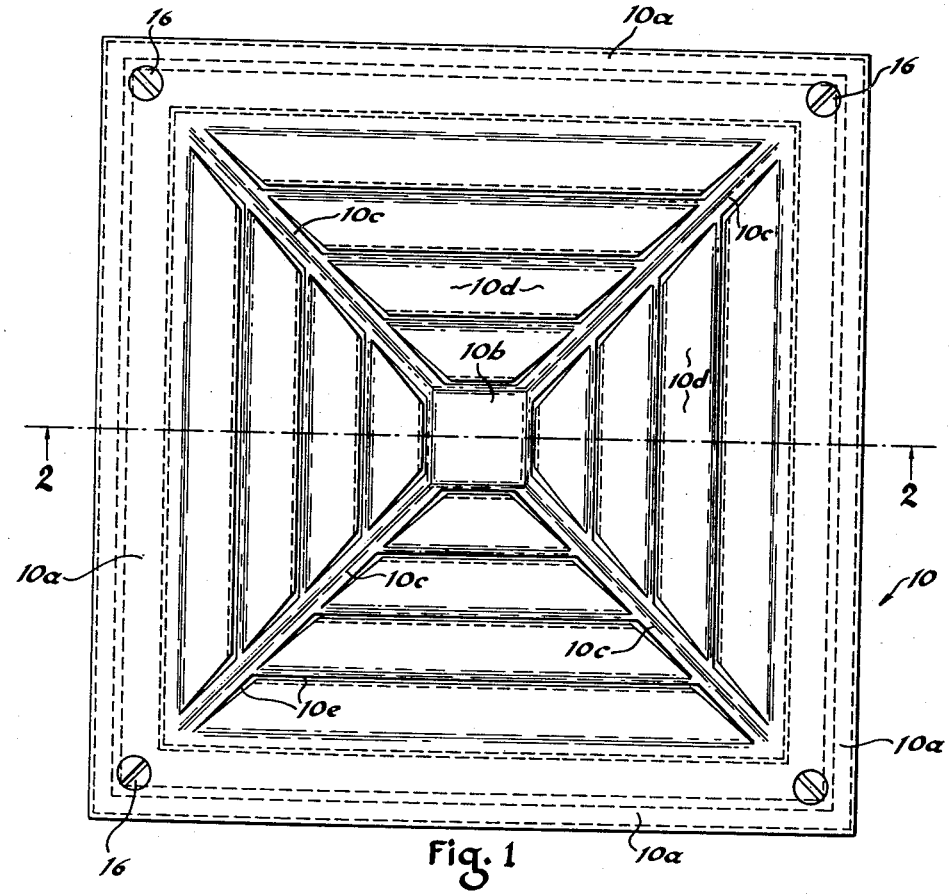

Before the ventilator grill here illustrated is specifically described, it is to be understood that the invention here involved is not limited to the structural details or arrangement of parts here shown since grills embodying the present invention may take various forms. It also is to be understood that the phraseology or terminology herein employed is for purposes of description and not of limitation since the scope of the present invention is denoted by the appended claim.

Those familiar with this art will recognize that this grill may be applied in many ways. However, it has been chosen to illustrate it as a ventilator grill wherein either hot air passes outwardly therethrough to elevate the temperature of the surrounding room or cold air passes outwardly therethrough to cool the surrounding room. However, it can be readily understood that this grill can be used as readily on an air inlet as on an air outlet.

The ventilator grill in the present invention is shown generally at 10 and is manufactured by cutting and forming a single generally rectangular piece of flat sheet metal by a punch press operation.

The ventilator grill has an outer rim member or frame 10a having a generally rectangular inner and outer edge. The words "generally rectangular" as used in the specification and claims include not only a rectangle but also a square since a square is a specific form of rectangle. The grill disclosed in the drawings is this specific square form but will be described as generally rectangular since this is the structure in its broadest sense. A generally rectangular central member 10b is supported by a plurality of supporting and dividing strips 10c, four in number, with each aligned pair of opposite strips extending along a diagonal of the generally rectangular outer rim 10a with each strip 10c connected at opposite ends to the rim 10a and the central member 10b. Hence, the central member 10b is supported within the generally rectangular open space within the confines of the rim 10a by the inwardly extending supporting and dividing strips 10c which extends inwardly from the edge of the generally rectangular open area formed by the outer frame or rim 10a. The central member 10b serves as a means for connecting the inner ends of the strips 10c.

Adjacent supporting strips 10c diverge in the outward direction to form a trapezoid in combination with the outer edge of the central member 10b and the inner edge of the frame 10a extending therebetween. There are four trapezoid shape sections formed by the four supporting and dividing strips 10c, as readily seen in Fig. 1.

Each section has a plurality of inwardly directed vanes 10d struck therefrom and extending inwardly at approximately a 45° angle to the plane of its associated section so that a flow passage 10e is provided between each of the adjacent vanes. Each vane except the outermost vane 10d in each section has narrow connections along a portion of its lateral side edges to the supporting and dividing strips 10c in Fig. 1, and the remaining lateral side edge portions are severed from the sides of the strips 10c. Hence, each vane portrudes outwardly in cantilever fashion from the section from which it was struck and has its distal end and lateral side edges free from the section so that the flow of air between the vanes is not impeded but the flow passages 10e are completely unobstructed from one end to the other.

When the grill is being formed by the punch press operation, the central portion of the grill is caused to protrude or belly convex outwardly to generally form a frustrum of a regular generally rectangular pyramid. The center generally rectangular member 10b forms the top thereof in Fig. 2, the plane of each section forms a side thereof, each strip 10c forms an edge thereof, and the generally rectangular open area within and defined by the frame 10a forms the base thereof.

The grill 10 can be attached to an air carrying flue, stack, etc. For such attachment, a tube 14, formed of sheet metal and having an outwardly extending flange 14a, is disposed at the inner side of the grill and attached thereto by screws 16, four in number, passing through the frame 10a and inwardly through the flange 14a with said screws preferably cutting their own threads in this flange. The outer edge of the frame 10a is downwardly bent in the form of a continuous flange 10f to retain a sealing gasket 12 formed of rubber or other equivalent material to bear against the wall of the room when this grill is located at the open end of a ventilator pipe, air flue or stack.

This ventilator grill is especially adapted for installation in a wall of a generally rectangular room. The word "wall" as used therein includes any one of the room walls, namely, the top wall (ceiling), either of the four side walls, or the bottom wall (floor). The grill is located on one of the walls with each vane 10d thereof having its lengthwise dimension extending generally parallel to at least one of the walls of the room surrounding the grill mounting wall. This grill construction enables the air passing therethrough to diffuse outwardly in all directions on the outside thereof with the emerging air stream from passageways 10e advancing toward the room walls. Since each vane extends parallel to the wall toward which it directs its air stream and the vanes 10d and frame 10a are generally concentric with the surounding walls of the room (located equidistant from opposite walls), the air emerging from the grill is uniformly diffused throughout the room. The concentricity between the grill and room presents vane length and passage flow area toward each wall in proportion to the length of said wall.

Figure 2:
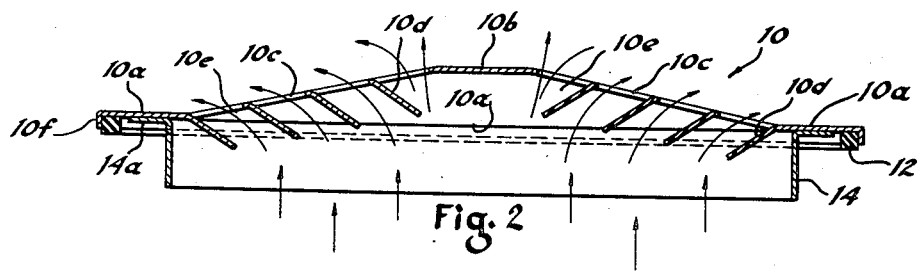
Fig. 2 is a vertical section therethrough taken along the line 2—2 of Fig. 1.

The grill construction provides good air diffusion for verticaly moving air in Fig. 2 for the following reasons. First, the vanes are spaced so that perpendicular lines in Fig. 2 touching the free or distal edge of each vane will pass through the passageway 10e and are spaced from the edge of the plate opening formed by cutting out the distal edge of said vane. Hence, some of the vertically upwardly moving air in Fig. 2 can continue in the vertical direction unaffected by the vanes 10d. Second, other vertically upwardly moving air in Fig. 2 strikes against the inner, inclined sides of the vanes 10d and is directed outwardly at angles not exceeding 45° to the plane of the associated vane section.

It should be noted that the supporting and dividing strips 10c in Fig. 1 are quite narrow so that they offer minimum impedance to the air flow, that the passageways 10e are longer than they are wide, that the lateral side edges of each vane are free from its associated straddling strips 10c in Fig. 1 so that the air flow is substantially uniformly distributed in the form of a frustrum of a pyramid progressively increasing in the width of its base with this base extending generally parallel to the base of the frustrum of the pyramid formed by the grill. Also, no appreciable central area vertically above central member 10b in Fig. 2 escapes the influence of the conditioned air emerging from the grill. The emerging air is largely almost uniformly delivered and mixed with the other air in the room in like volume at like distances outwardly from the grill. The grill, being bellied outwardly in the shape of a frustrum of a pyramid, causes the emerging air to be diffused outwardly along the wall on which the grill is mounted, against the four walls surrounding the mounting wall, and against the wall opposite to the mounting wall.

When the grill 10 has the preferred square outer edge outline of Fig. 1, it can be attractively fitted into the existing interior decorated design of any office, residential, commercial or industrial building room. For example, in a room with one or more of its walls finished with a square acoustical tile block or a square wall finishing block, the ventilator grill can be made substantially the same size as one of the square blocks so that a grill can be used instead of one of the blocks while still preserving the uniform square block appearance of the wall. It should be noted that each vane 10d has its free distal edge generally parallel to the inner and outer edges of the frame 10a and to the outer edge of the central member 10b. Since these blocks generally have their edges parallel to the surrounding walls of the room, the superior air flow characteristics of this generally rectangular ventilator grill can be readily utilized while preserving the artistic design of the room. Of course, if the blocks are small and the ventilator grill is large, the grill can be of a size to substitute for a whole number of blocks, such as four blocks, and the appearance will be substantially the same. Also, if the grill is of a smaller or larger square size, the square block appearance of the room will still be preserved.

Various changes in details and arrangement of parts can be made by one skilled in the art without departing from the spirit of this invention or the scope of the appended claim.

What I claim is:

A ventilator grill, comprising integrally connected together a generally rectangular outer rim member with the rectanguluar form lying in a plane and a central generally rectangular member concentric therewith, a plurality of supporting and dividing strips with each lying in a plane normal to said first mentioned plane and containing a diagonal of said generally rectangular outer rim form and connected at opposite ends to said members to divide the space between said members into a plurality of sections, a plurality of vanes in each section connected at their lateral side edges with adjacent dividing strips to provide a completely unobstructed passage between adjacent vanes, each vane having the lengthwise dimension extending generally parallel to the adjacent outer rim member, each generally rectangular edge of the outer rim member, each vane being positioned angularly with respect to the plane of its section, and said grill being bellied outwardly at its middle generally into a frustum of a regular generally rectangular pyramid with said central generally rectangular member forming the top and with each section forming a side and with each strip forming an edge, the free edge of each vane extending inwardly into said frustum, whereby uniformly diffused air flow results outside thereof.

References Cited in the file of this patent

UNITED STATES PATENTS

| | | |
|---|---|---|
| 549,897 | Carroll | Nov. 19, 1895 |
| 899,684 | Selg | Sept. 29, 1908 |
| 2,021,086 | Oskamp | Nov. 12, 1935 |
| 2,598,763 | De Roo | June 3, 1952 |

FOREIGN PATENTS

| | | |
|---|---|---|
| 497,029 | Great Britain | Dec. 12, 1938 |

OTHER REFERENCES

Barber-Coleman Advertisement, published by "Heating and Ventilating," May 1951 (page 24 relied on).